(12) United States Patent
Bach et al.

(10) Patent No.: US 9,078,449 B2
(45) Date of Patent: Jul. 14, 2015

(54) COOK TOP GRATE AS UTENSIL SIZE/PRESENCE DETECTOR

(75) Inventors: James Carter Bach, Seymour, IN (US); Paul Bryan Cadima, Prospect, KY (US)

(73) Assignee: General Electric Company, Schenectady, NY (US)

(*) Notice: Subject to any disclaimer, the term of this patent is extended or adjusted under 35 U.S.C. 154(b) by 287 days.

(21) Appl. No.: 13/556,602

(22) Filed: Jul. 24, 2012

(65) Prior Publication Data

US 2014/0027439 A1 Jan. 30, 2014

(51) Int. Cl.
| A21B 1/00 | (2006.01) |
| A21B 1/22 | (2006.01) |
| H05B 1/02 | (2006.01) |
| H05B 3/68 | (2006.01) |

(52) U.S. Cl.
CPC ........................................ *A21B 1/22* (2013.01)

(58) Field of Classification Search
CPC ...... H05B 6/062; H05B 6/1254; H05B 3/748; A21B 1/22; F24C 14/02; F24C 15/022; F24C 7/087; F24C 7/08; F24C 7/082
USPC .............. 219/621, 506, 446.1, 622, 647, 518, 219/764, 770–771, 778–779, 725, 219/448.12–448.13, 452.11–452.12, 463, 219/465, 467, 468, 541, 543, 449; 126/40; 426/237, 238–243; 392/438, 439; 338/280–281, 283–285
See application file for complete search history.

(56) References Cited

U.S. PATENT DOCUMENTS

| 3,530,499 | A | * | 9/1970 | Schroeder ..................... 219/624 |
| 3,612,828 | A | * | 10/1971 | Siegla ....................... 219/461.1 |
| 3,719,798 | A | * | 3/1973 | Nelson et al. ................. 219/512 |
| 3,781,503 | A | * | 12/1973 | Harnden et al. ............... 219/622 |
| 3,973,105 | A | * | 8/1976 | Tsumori ...................... 219/626 |
| 3,980,858 | A | * | 9/1976 | Hibino ......................... 219/624 |
| 4,131,778 | A | * | 12/1978 | Tanaka et al. ................. 219/754 |
| 4,313,043 | A | * | 1/1982 | White et al. .................. 219/757 |
| 4,348,571 | A | * | 9/1982 | Dills ............................ 219/622 |
| 4,740,664 | A | * | 4/1988 | Payne et al. .............. 219/448.12 |
| 4,978,826 | A | * | 12/1990 | DeRuiter et al. ............... 219/771 |
| 4,982,063 | A | * | 1/1991 | Tsunekawa et al. ........... 219/723 |
| 5,498,853 | A | * | 3/1996 | Gross et al. ................ 219/461.1 |
| 6,288,374 | B1 | * | 9/2001 | Eskildsen et al. ............. 219/621 |
| 6,303,166 | B1 | * | 10/2001 | Kolbe et al. ................... 426/237 |
| 6,888,107 | B2 | * | 5/2005 | McFarland ............... 219/452.12 |
| 7,895,999 | B2 | | 3/2011 | Graham et al. |
| 2006/0081615 | A1 | * | 4/2006 | Kataoka et al. ............... 219/622 |
| 2010/0239987 | A1 | | 9/2010 | Baier |
| 2011/0083663 | A1 | | 4/2011 | Baier et al. |

FOREIGN PATENT DOCUMENTS

WO       WO 0063620       10/2000

* cited by examiner

*Primary Examiner* — Sang Y Paik
*Assistant Examiner* — Gyounghyun Bae
(74) *Attorney, Agent, or Firm* — Dority & Manning, P.A.

(57) ABSTRACT

A cooking appliance and a method of controlling a cooking appliance are provided. The cooking appliance has a cooking utensil support structure configured as a sensor for determining a cooking utensil characteristic, such as the size and/or presence of a cooking utensil. The cooking utensil support structure can include a gap and an electrical characteristic can be detected at the gap. The detected electrical characteristic can be used to determine a cooking utensil characteristic. Control of the cooking appliance can be based on the detected electrical characteristic or the determined cooking utensil characteristic. The cooking appliance can be controlled to improve cooking performance, such as regulate the amount of heat supplied by a heat source based on the size and/or presence of a cooking utensil, and/or to initiate an alert condition.

5 Claims, 8 Drawing Sheets

COOK TOP GRATE AS UTENSIL SIZE/PRESENCE DETECTOR

FIELD OF THE INVENTION

The present subject matter relates generally to a cooking system, and more particularly to, a method and apparatus to improve cook top control using a utensil support structure to detect cookware characteristics.

BACKGROUND OF THE INVENTION

Cook tops, ovens and ranges typically include one or more heat sources to provide energy to heat food within a cooking utensil. A user can operate the cooking appliance using an input device such as a knob. When the user initiates cooking using the input device, the heat source is initiated. A cooking utensil, such as a pot or pan, can be placed in the vicinity of the heat source for cooking.

The burners of the cook tops are generally controlled solely by a user adjusting the input device to the desired heating level. The size of the cooking utensil, the material of the cooking utensil, and the type and/or amount of food placed within utensil are a few characteristics that influence cooking However, in conventional cook tops these characteristics are not automatically considered when determining the output of the heat source. For instance, the amount of heat applied to a burner is generally controlled manually by a user of the appliance.

While various methods for detecting the presence of a cooking utensil on a cook top are generally known, a need exists for an improved system and method of detecting a presence of a cooking utensil and other characteristics of the cooking utensil such as its size (e.g. diameter of bottom) or material type (e.g. aluminum, copper, stainless steel, etc.).

BRIEF DESCRIPTION OF THE INVENTION

Aspects and advantages of the invention will be set forth in part in the following description, or may be obvious from the description, or may be learned through practice of the invention.

One exemplary aspect of the present disclosure is directed to a cooking appliance including a heat source configured to supply heat for cooking food and a cooking utensil support structure disposed proximate to the heat source. The cooking utensil support structure has a gap. The cooking appliance further includes a controller that is configured to apply an electrical signal to the cooking utensil support structure proximate to the gap and detect an electrical characteristic induced by the electrical signal. The controller is further configured to determine a cooking utensil characteristic based on the electrical characteristic.

Another exemplary aspect of the present disclosure is directed to a method of controlling a cooking appliance. The method includes applying an electrical signal to a cooking utensil support structure of the cooking appliance, where the electrical signal is applied proximate to a gap formed in the utensil support structure; detecting an electrical characteristic induced on the cooking utensil support structure by the electrical signal; and determining a cooking utensil characteristic based on the detected electrical characteristic.

Yet another exemplary aspect of the present disclosure is directed to a cooking utensil support structure for a cooking appliance. The cooking utensil support structure including a plurality of protrusions configured to support a cooking utensil. The cooking utensil support structure can further include an electrical conductor having a gap, the electrical conductor configured to receive an electrical signal and configured to be disposed in contact with a surface of the cooking appliance.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
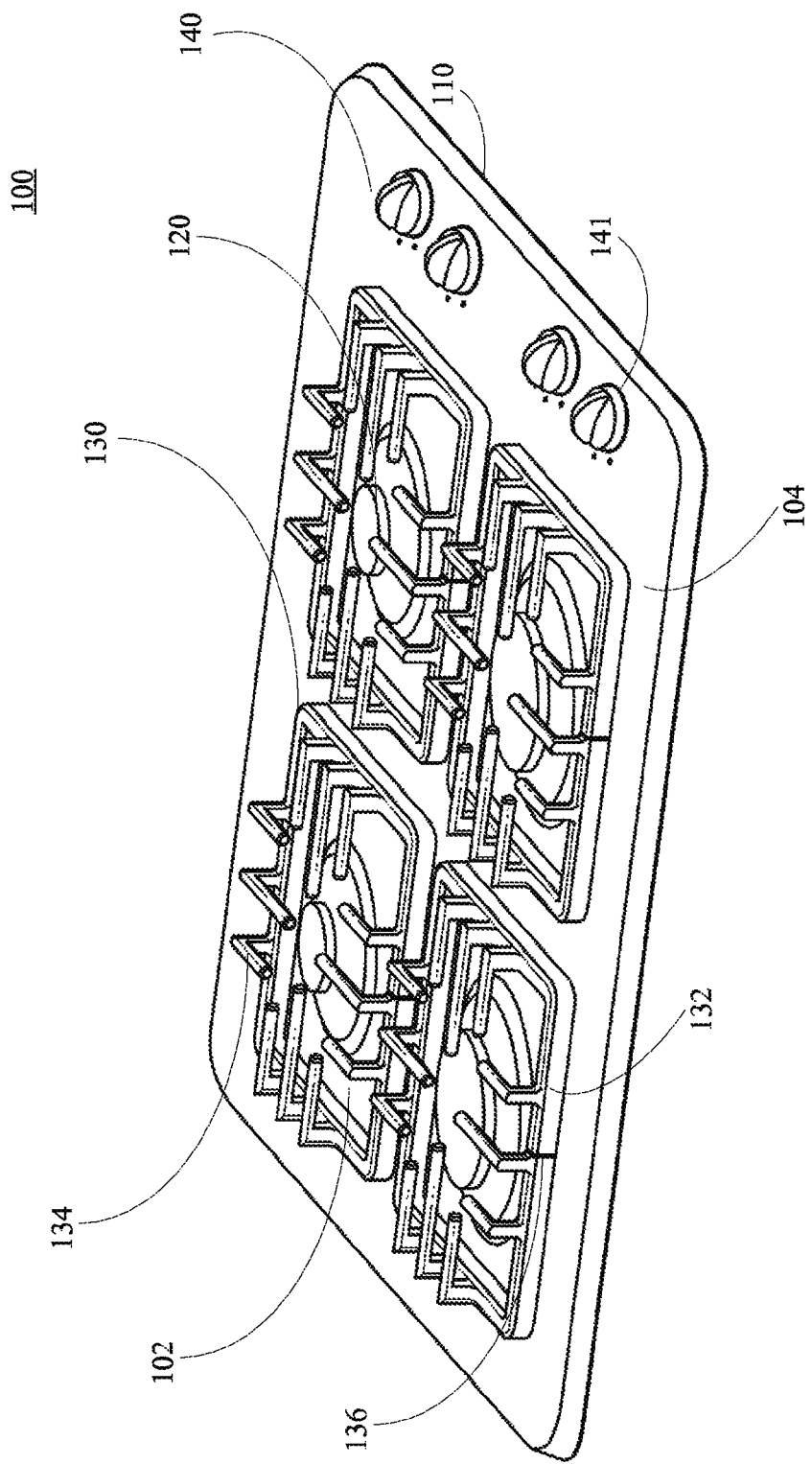
FIG. 1 depicts a top perspective view of an exemplary gas cook top appliance according to an exemplary embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to a cooking appliance and a method of controlling the cooking appliance using a utensil support structure to detect cookware characteristics. For instance, the cooking appliance can be a gas cook top or an electric resistance cook top. The cooking utensil support structure can include a gap and an electrical characteristic can be detected across the gap. The detected electrical characteristic can be used to determine a cooking utensil characteristic. Control of the cooking appliance can be based on the detected electrical characteristic or the cooking utensil characteristic. The cooking appliance can be controlled to improve cooking performance, such as to regulate energy supplied to a burner, to tune the system for determining a cooking utensil characteristic and/or to initiate an alert condition.

FIG. 1 illustrates an exemplary embodiment of a gas cook top appliance 100. Gas cook top 100 is provided by way of example only. The present subject matter can be used with other suitable configurations, such as any configuration with at least one gas burner having a cooking utensil support structure. In addition, the present disclosure can also be implemented with other types of heat sources, such as an electric resistance (coil) heating element, which utilize a cooking utensil support structure (grate). The cook top appliance can form a part of or be combined with other appliances, such as an oven.

Gas cook top 100 can be installed in a chassis 110 and in various configurations such as in cabinetry in a kitchen, coupled with one or more ovens or as a stand-alone appliance. Cook top 100 can include burner assemblies 120, cooking utensil supporting structures 130, and a user interface 140.

Burner assemblies 120 are positioned spaced apart from each other and each burner assembly 120 can be surrounded by a recessed area 102 of the cook top 100. The recessed areas 102 are positioned below an upper surface 104 of cook top 100. Each burner assembly 120 extends upwardly through an opening in the recessed areas 102. A cooking utensil supporting structure 130, such as a grate, is positioned in the recessed areas 102 and over each burner assembly 120. Each grate 130 can include a base portion 132 having a gap 136 and a plurality of projections 134 coupled to the base 132 to provide a surface to support a cooking utensil over the burner assemblies 120 for cooking.

While cook top 100 includes four burner assemblies (e.g. two small burners and two larger burners), it is contemplated that the cook top can be configured to include any number and/or size of burner assemblies. In addition, a burner assembly 120 can be used in combination with other types of cooking heating sources, such as an electric resistance (coil) element or an induction coil element. Further, other burner assembly/grate arrangements can be used with the burner assemblies, such as the burners 120 and/or grates 130 disposed directly on the upper surface 104 of the cook top without recesses (e.g. gas-on-glass cook tops).

The user interface 140 allows a user to select various options for the operation of cook top 100 including options such as a desired burner, a burner ignition, a burner temperature, and/or various other options. The user interface 140 can be any type of input device and can be in any configuration or location. In the illustrated embodiment, the user interface 140 is located within a portion of the upper surface 104 of the cook top 100. Alternatively, the user interface 140 can be positioned on an essentially vertical surface near a front side or back side (i.e. backsplash) of the appliance 100 or anywhere convenient for a user to access during operation of the cook top. The input component 141 can allow for the selective activation, adjustment or control of any or all burner assemblies 120 as well as any timer features or other user adjustable inputs. The input component 141 can include one or more of a variety of electrical, mechanical or electro-mechanical input devices including rotary dials (knobs), push buttons, toggle/rocker switches, and touch pads can also be used singularly or in combination with a capacitive touch screen input device component. The user interface 140 can also include a display component, such as a digital or analog display device designed to provide operational feedback to a user.

Figure 2:
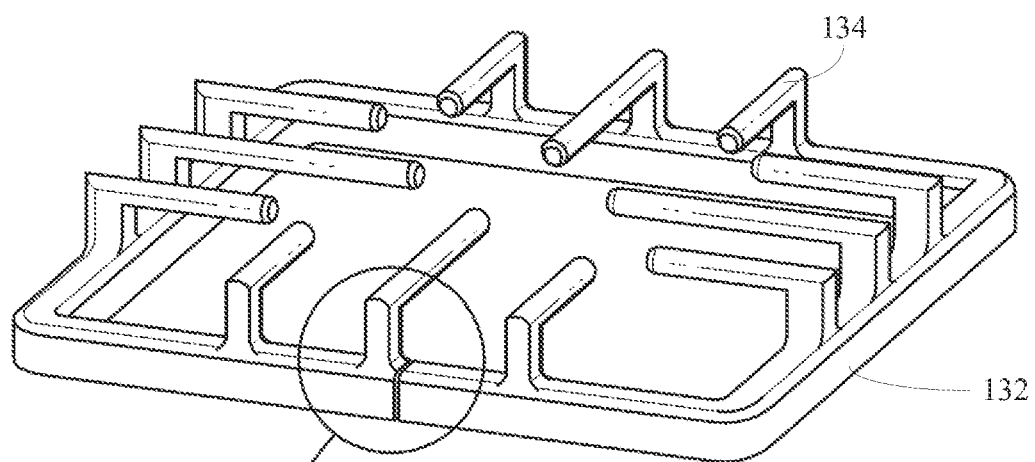
FIG. 2 depicts an exemplary cooking utensil support structure according to an exemplary embodiment of the present disclosure.
Figure 3:
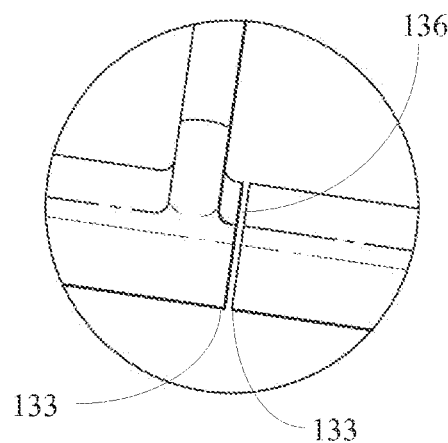
FIG. 3 depicts a close-up view of a portion of the exemplary cooking utensil support structure of FIG. 2 according to an exemplary embodiment of the present disclosure.

FIGS. 2 and 3 illustrate an exemplary embodiment of a cooking utensil support structure 130 for a cook top appliance. It should be understood that cooking utensil support structure (grate) 130 can have any configuration or shape, such as circular, rectangular, or the like. In addition, while illustrated as a grate corresponding to one heat source, it is also contemplated that a grate can surround a plurality of heat sources.

Grate 130 includes a base 132 and a plurality of projections 134 coupled with the base 132 and can be manufactured out of any material capable of conducting an electrical signal. Projections 134 can be electrically isolated from one another such that they do not extend completely across the center of the burner zone. Alternatively, projections 134 can connect across the center of the burner zone.

A gap 136 can be formed in base 132 of the grate 130 and can serve as a connection point for conductors coupled to the control system circuitry. While gap 136 is illustrated near the center of one edge of the grate 130, gap 136 can be located on any portion of the grate 130.

Grate 130 can be elevated above the cooking surface 104 or the recess 102 on which the grate rests, using an electrically insulative material such as silicon rubber, to prevent scratching of the appliance's surface. In a preferred embodiment, the electrically insulative material can also electrically isolate the inductive loop formed when an electrical signal is applied across the gap 136 in the grate 130. In addition, elevating the bottom of the grate base 132 (e.g. 0.1-0.3 inches) above the cooking surface 104 can provide electrical isolation of the inductance loop when the appliance chassis is metallic. However, elevation may not be necessary when the grate 130 rests on a non-electrically conductive (e.g. ceramic-glass) cook top surface.

Grate 130 can be employed as a sensor to determine a cooking utensil characteristic. As used herein, a cooking utensil characteristic refers to any characteristic associated with the cooking utensil, such as size, shape, material, location, presence, heat conductivity, and/or any other type of characteristic. For instance, a size of the cooking utensil can be identified as a category such as small, medium, large or by diameter. The shape of the cooking utensil can include a pot, a pan, a wok, and/or any other type of cooking utensil. A material of the cooking utensil can include a ferrous, semi-ferrous, or a non-ferrous material. A location of the cooking utensil with respect to the grate can indicate a position of the cooking utensil with respect to the center of the grate. A heat conductivity of the pan can be determined when the material type has been determined.

An electrical signal can be applied to the grate 130 at electrical contact surfaces 133 corresponding to the opposing sides of the gap 136. For instance, the electrical signal can be a high frequency alternating current (AC) signal (e.g. 1 kHz to 1 MHz) or a radio frequency (RF) signal (e.g. 1 MHz to 1 GHz). The electrical signal applied to the contacts can be a low voltage, low current signal. The signal can be "pulsed" at a low duty cycle to further minimize the amount of energy present at the contact surfaces.

An electrical contact surface 133 can be disposed proximate to each side of the gap 136 where an electrical signal can be applied across the gap 136 to induce an electrical characteristic loop within the grate 130. The electrical contact surface 133 can be a surface on the base 132 in electrical contact with electrical contacts on the upper surface 104 of the cook top 100 or an electrically conductive element (e.g. contact surface) can be coupled to the grate 130 proximate to each side of the gap 136. In one embodiment of the present disclosure, the electrical contacts can be spring-loaded pins.

The electrical characteristic induced within the grate can be a resistance, a reactance, an impedance, a capacitance, an inductance, a phase angle, and/or a resonant frequency. When a plurality of electrical characteristics is measured, the electrical characteristics can be measured separately or simultaneously. The existence of a cooking utensil constructed of an electrically-conductive material can cause a change or shift in the electrical characteristics in proportion to the amount of material (e.g. size of the utensil) in the vicinity of the loop. For instance, a change in magnitude of the electrical characteristic can correspond to a size of the cooking utensil.

The electrical characteristic can be detected across the electrical contact surface 133 and a signal indicative of the detected electrical characteristic can be communicated to a controller. The controller can be configured to determine a cooking utensil characteristic based on the detected electrical characteristic or on a detected shift or change of the electrical characteristic. For instance, the controller can determine cooking utensil characteristics using lookup tables, algorithms, models, and/or equations.

For example, to determine a cooking utensil material an impedance having a real and an imaginary element can be detected. Different types of cooking utensil material, such as ferrous, semi-ferrous, and non-ferrous, have different impedance characteristics. A predetermined impedance model including real and imaginary elements can be determined for each type of material. When a cooking utensil is placed on a grate and an electrical signal is applied across a gap in the grate, an impedance having real and imaginary elements can be detected. The detected impedance can be compared to the predetermined impedance models to determine the type of cooking utensil material.

Figure 4:
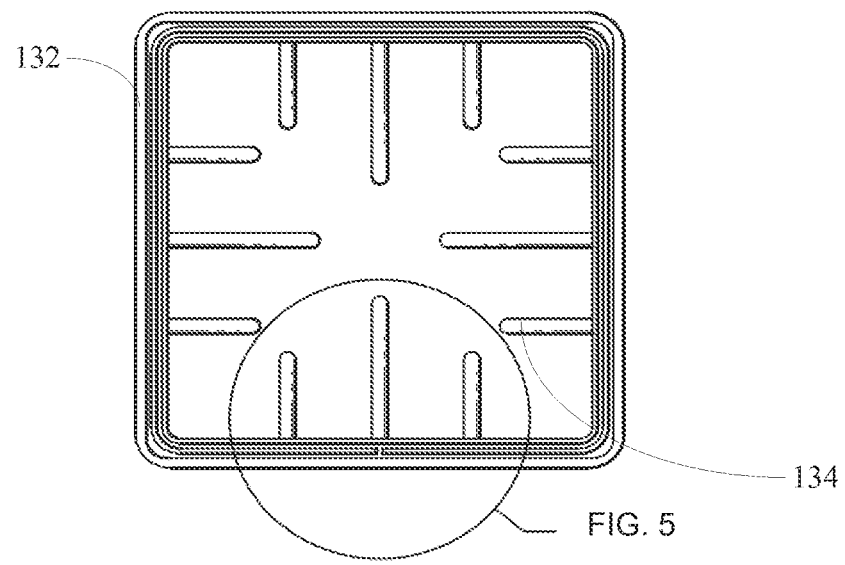
FIG. 4 depicts an exemplary cooking utensil support structure according to an exemplary embodiment of the present disclosure.
Figure 5:
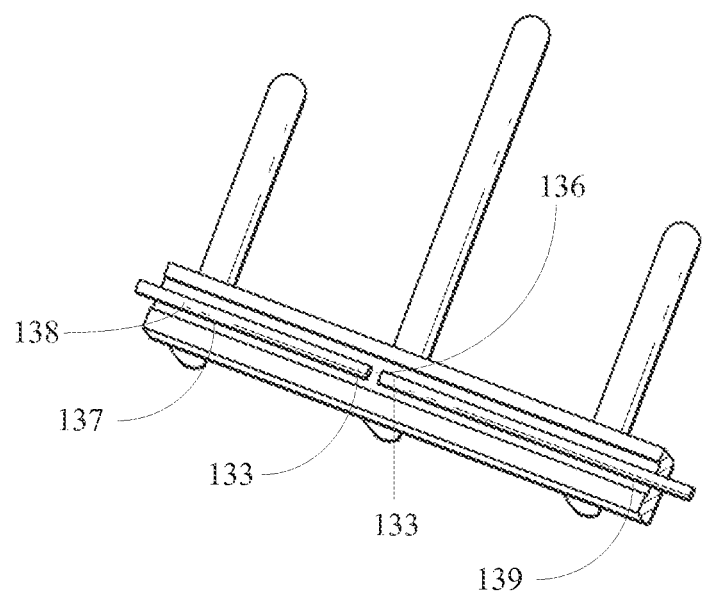
FIG. 5 depicts a close-up view of a portion of the exemplary cooking utensil support structure of FIG. 4 according to an exemplary embodiment of the present disclosure.

FIGS. 4 and 5 illustrate an alternative exemplary embodiment of a cooking utensil support structure 130 of a cook top appliance. In this embodiment, a grate 130 can be manufactured out of any material such an electrically conductive or non-electrically conductive material. A channel 137 can be formed in the bottom surface of the grate base 132 and an electrical conductor, such as a wire, 138 can be disposed within the channel. An insulation material 139 can be disposed between the channel 137 in the grate base 132 and the electrical conductor 138. An electrical contact surface 133 can be disposed proximate to each side of the gap 136. The electrical contact surface 133 can be a surface on the base 132 in electrical contact with electrical contacts on the upper surface 104 of the cook top 100 or an electrically conductive element can be coupled to the grate 130 proximate to each side of the gap 136.

The electrical conductor 138 can be configured as a single loop around the base of the grate or multiple loops (windings) of the conductor around the base forming a coil. When the electrical conductor 138 is configured with multiple loops, the conductor can include an insulative coating to prevent the windings from shorting with each other (as well as shorting to the base itself). In addition, the electrical conductor can be a painted-on and heat-cured electrically-conductive paint. When the electrical conductor comprises electrically-conductive paint, the paint can be applied to the grate 130 and a channel 137 may not be necessarily formed in the base 132. In any/all cases, the electrical conductor is electrically insulated from the grate base.

Figure 6:
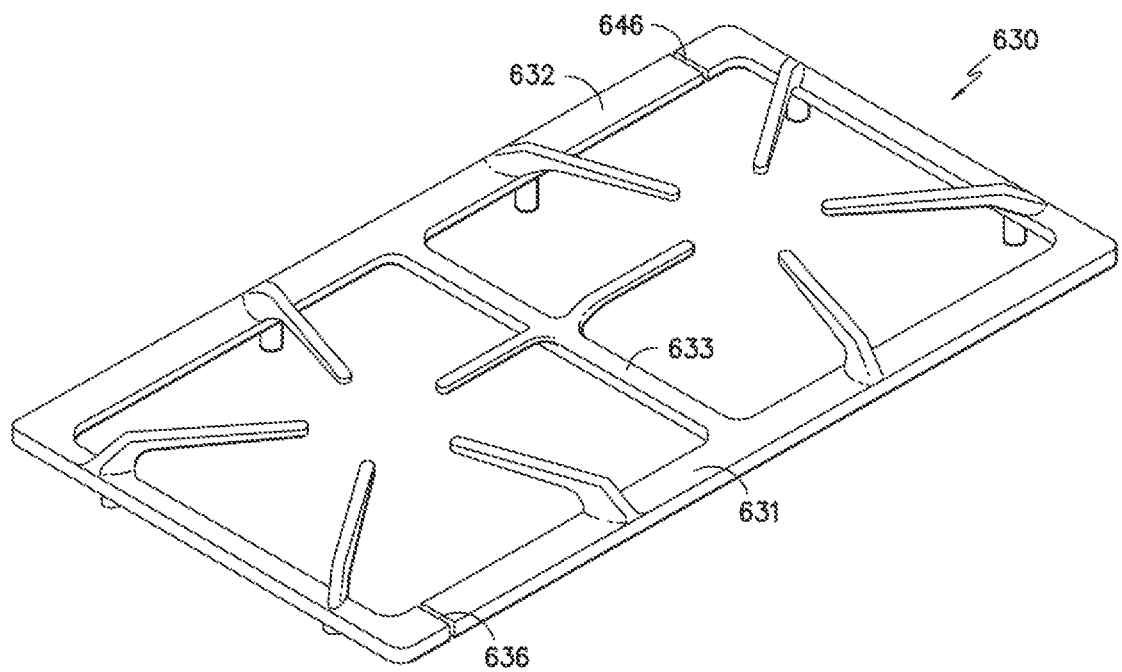
FIG. 6 depicts an exemplary cooking utensil support structure according to an exemplary embodiment of the present disclosure.

FIG. 6 illustrates an alternative exemplary embodiment of a cooking utensil support structure 630. Cooking utensil support structure 630 can be configured to correspond to a plurality of heat sources, such as two. For instance, as illustrated in FIG. 6, grate 630 can include a first portion 631 and a second portion 632.

A first gap 636 can be formed in the first portion of the grate 630 and a second gap 646 can be formed in a second portion of the grate 630. However, grate 630 can have any configuration such that one gap can correspond to each heating source.

Gaps 636, 646 can be disposed in any of the outer surfaces of the grate 630 such that an electrical signal can be applied across a gap, inducing an electrical characteristic loop within the portion of the grate corresponding to a single heat source. For instance, gaps 636 and 646 can be disposed in opposite positions, as illustrated. Alternatively, gaps 636 and 646 can be disposed on the same side, in close proximity with each other provided that an interior section 633 separates the gaps 636 and 646. The gaps could not be disposed in section 633, which is common to both heating area loops.

When a plurality of heat sources are in operation, an electrical characteristic loop can be induced to correspond to each heat source. For instance, an electrical characteristic loop can be alternately induced between the first portion 631 of grate 630 and a second portion 632. For example, an electrical signal can be applied across gap 636 and the electrical characteristic can be detected corresponding to the first portion 631. The electrical signal can be discontinued across gap 636 and then applied to gap 646 where the electrical characteristic corresponding to the second portion 632 can be detected.

Figure 7:
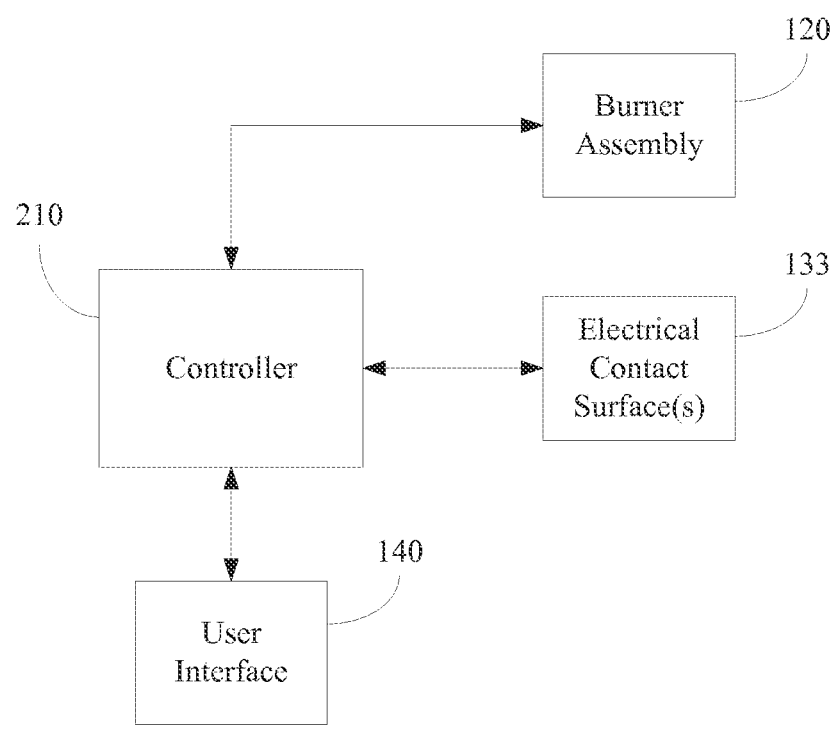
FIG. 7 depicts a block diagram of an exemplary control system according to an exemplary embodiment of the present disclosure.

FIG. 7 illustrates a schematic block diagram of a cook top 100 including an exemplary control system 200 associated with cook top 100. Operation of cook top 100 can be regulated by a controller 210 that is operatively coupled i.e., in communication with, user interface 140, burner assemblies 120, an electrical contact surface 133 of a grate and/or any other element that is further described. For example, in response to user manipulation of the user interface 140, the controller can operate burner assembly 120.

The controller can be configured to regulate gas flow, initiate ignition of the gas, etc. based on information corresponding to a signal received from the user interface 140. The controller can also be provided with other features as will be further described herein. Controller 210 can be the only controller of the cook top appliance 100 or it could be a subcontroller of the overall appliance controller. If it is a subcontroller, it can be located within the overall appliance controller or separate from such controller.

By way of example, any/all of the "controllers" discussed in this disclosure can include a memory and one or more processing devices such as microprocessors, CPUs or the like, such as general or special purpose microprocessors operable to execute programming instructions or micro-control code associated with operation of cook top appliance 100. The memory can represent random access memory such as DRAM, or read only memory such as ROM or FLASH. In one embodiment, the processor executes programming instructions stored in memory. The memory can be a separate component from the processor or can be included onboard within the processor. Alternatively, the controller might also be constructed without using a microprocessor, using a combination of discrete analog and/or digital logic circuitry (such as amplifiers, integrators, comparators, flip-flops, AND gates, and the like) to perform control functionality instead of relying upon software.

The controllers discussed within this disclosure can be positioned in a variety of locations throughout cook top appliance 100. In the illustrated embodiment, the primary appliance controller can be located under or next to the user interface 140 or otherwise below the upper surface 104 of cook top 100. In such an embodiment, input/output ("I/O") signals are routed between the controller and various operational components of cook top 100 such as burner assemblies 120, user interface 140, a display, sensor(s), alarms, and/or other components as can be provided.

After a cooking utensil is placed on the grate 130 and a user input is provided at the user interface 140, the controller 210 can initiate a normal cooking operation cycle. For instance, the user input can be indicative of a desired cooking level, such as low, medium, or high, and the controller 210 can provide a signal to a heat source to begin heating to a desired cooking level and provide a signal to an ignition device to ignite the gas to generate a flame, when a flame is used as a heat source at the desired cooking level.

In addition to the normal cooking operation cycle, the controller 210 can initiate an electrical characteristic detection cycle. During the electrical characteristic detection cycle, the controller 210 provides an electrical signal to the electrical contact surface(s) 133 on the grate 130. The electrical contact surface(s) 133 can be disposed on either side of the gap 136. After the electrical signal is applied to the electrical contact surface 133, an electrical characteristic is induced on the grate 130 and the controller detects the electrical characteristic at the electrical contact surface(s) 133.

For example, the electrical signal can be applied to an electrical contact surface 133 proximate to the gap and then the controller can detect across the gap 136 the electrical characteristic induced on the grate 130 at the electrical contact surface 133. The electrical signal can pass through the grate 130 and induce an electrical characteristic that is influenced by at least the grate and/or the cooking utensil. The detected electrical characteristic can be an impedance induced in the loop of the grate, where the detected impedance can include a real and imaginary element.

After the electrical characteristic is detected across the gap 136 at the electrical contact surface 133, the controller can use the detected electrical characteristic signal to determine a cooking utensil characteristic. The cooking utensil characteristic can be determined by comparing the detected electrical signal with a predetermined value or threshold range in a lookup table. Alternatively, the cooking utensil characteristic can be determined using an algorithm, equation, and/or model.

The controller 210 can compare the determined cooking utensil characteristic and/or detected electrical characteristic with a predetermined value or threshold range in another lookup table to determine whether a change in the control of the heat source is necessary. Alternatively, the change in heat source control can be performed by the controller 210 using an algorithm or an equation. When the determined cooking utensil or detected electrical characteristic does not equal the predetermined value or threshold range, the controller 210 can send a signal to the heat source indicating a modification in control. For instance, if the determined cooking utensil characteristic and/or detected electrical characteristic indicates that the cooking utensil is no longer present on the grate, the controller can send a signal to the heat source indicating that the heat source should be altered. For instance, when a gas burner is used, the controller can send a signal to the burner assembly indicating that the flame should be extinguished and gas flow suspended to the burner assembly. Alternatively, when the determined cooking utensil characteristic indicates that the cooking utensil has a small diameter, the controller can send a signal indicating a decrease in gas flow to the burner assembly so as to limit the flame size to something appropriate for the smaller pan.

Figure 8:
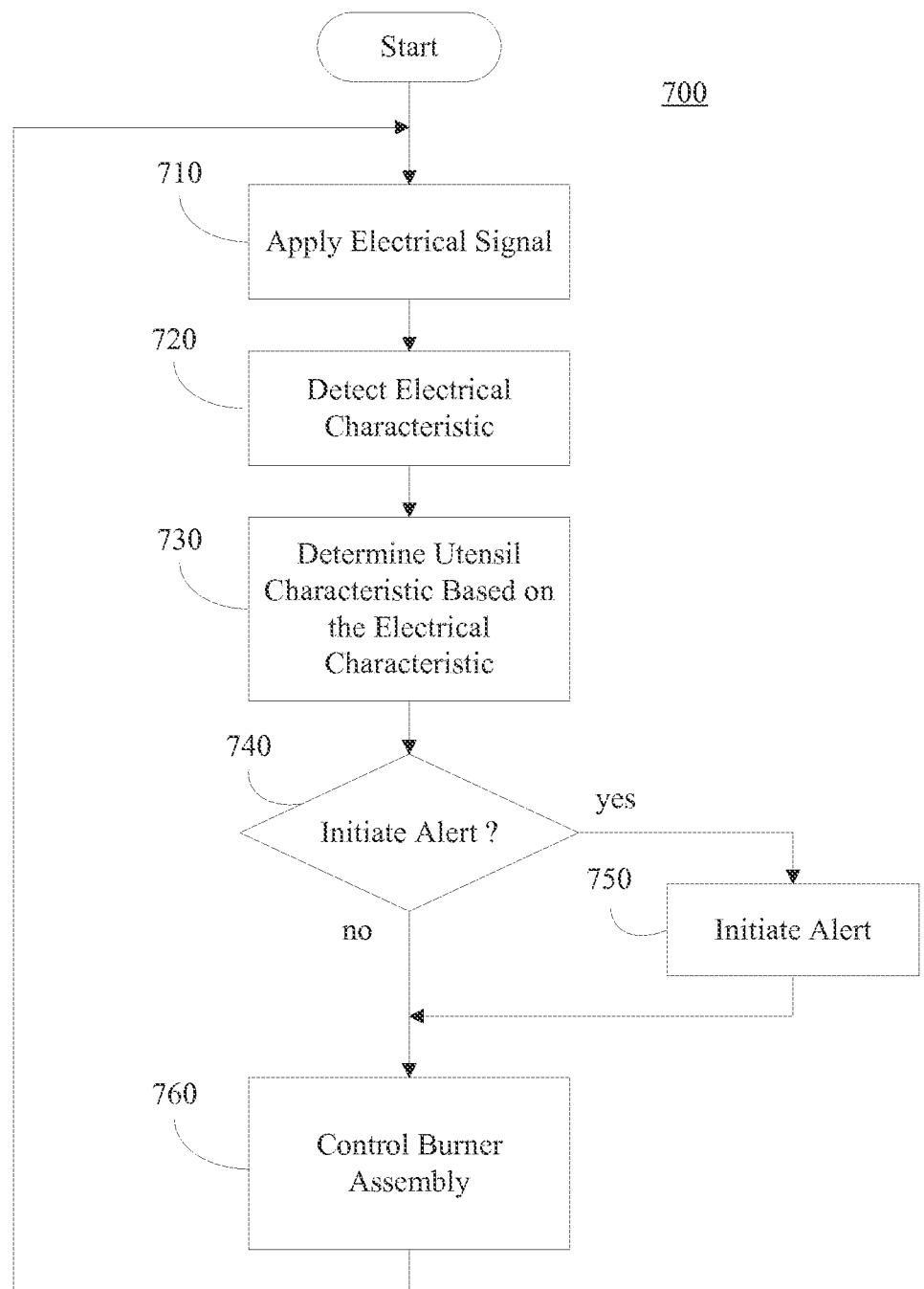
FIG. 8 depicts a flow chart of a method of controlling a cook top appliance according to an exemplary embodiment of the present disclosure.
Figure 9:
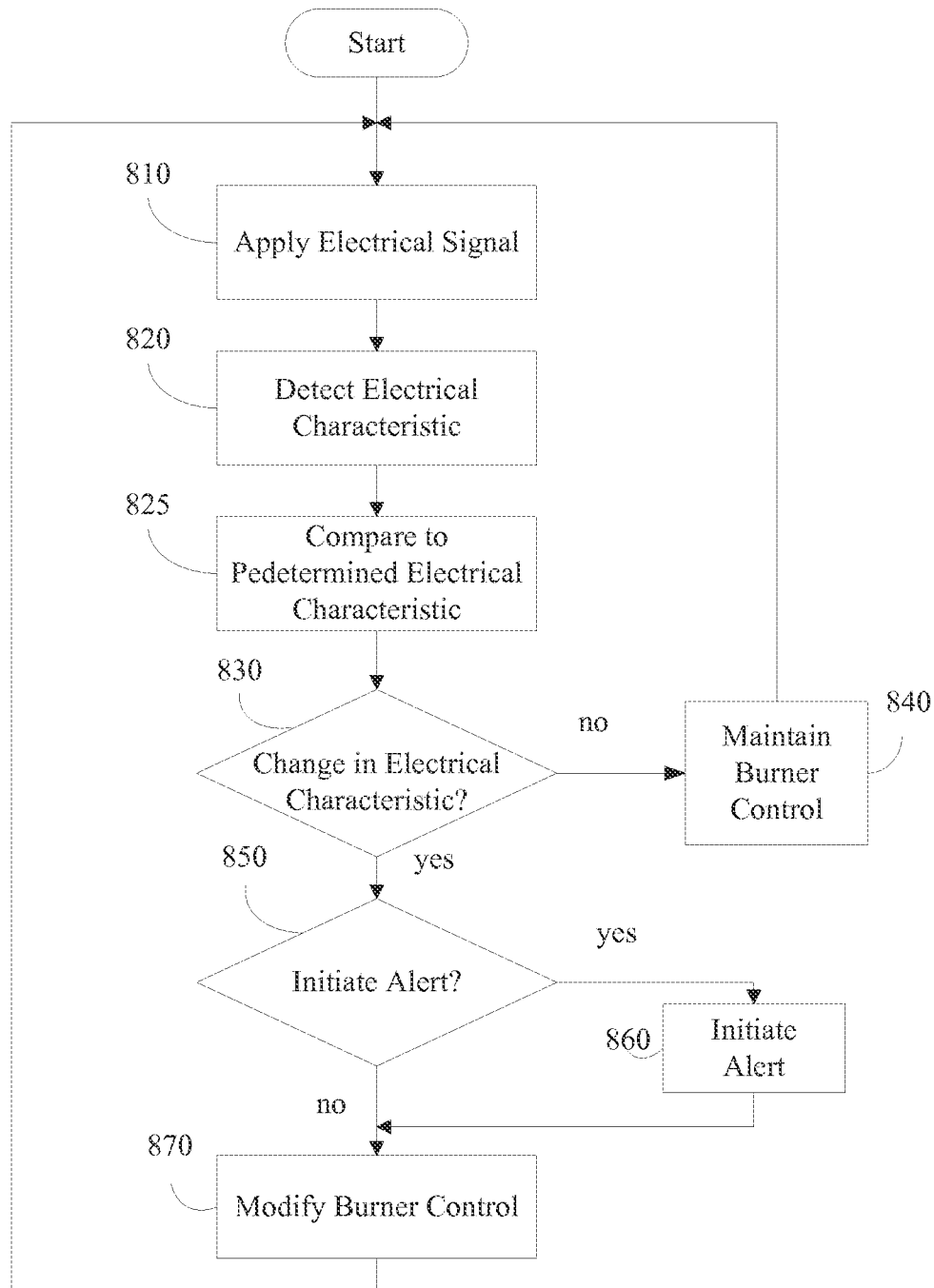
FIG. 9 depicts a flow chart of a method of controlling a cook top appliance according to an exemplary embodiment of the present disclosure.

FIGS. 8 and 9 illustrate a flow chart of exemplary methods 700 and 800 according to exemplary embodiments of the present disclosure. The methods 700 and 800 will be discussed with reference to the exemplary gas cook top systems illustrated in FIGS. 1-7. However, the methods 700 and 800 can be implemented with any suitable cook top system such as a gas or an electric resistance cook top system. In addition, although FIGS. 8 and 9 depict steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined and/or adapted in various ways.

FIG. 8 depicts a flow chart of a method of controlling a gas cook top appliance according to an exemplary embodiment of the present disclosure. As illustrated in FIG. 8, controller 210 can apply an electrical signal, such as an AC signal or an RF signal, to the grate at the electrical contact surfaces 133 at (710). An electrical characteristic can be induced in the loop of the grate 130. The electrical characteristic can be any characteristic caused by the electrical signal. For instance, the electrical characteristic can be a resistance, an impedance, a capacitance, an inductance, a reactance, a phase angle, and/or a resonant frequency. In addition, when the electrical characteristic is an impedance, the impedance can include real (i.e. resistive) and imaginary (i.e. reactive) components as well as a magnitude and phase angle components. Each component can be indicative of the same cooking utensil characteristic or each component can be indicative of a different cooking utensil characteristic. Multiple characteristics can be measured simultaneously to determine multiple characteristics of the cooking utensil being sensed.

At (720), the controller 210 can detect the electrical characteristic induced on the grate 130 at electrical contact surfaces 133. The controller can determine a cooking utensil characteristic based on the detected electrical characteristic at (730) using any suitable conversion method such as a lookup table, an algorithm, an equation, and/or a model.

A determination can be made to initiate an alert at (740) and an alert can be initiated at (750) based on the electrical characteristic and/or the cooking utensil characteristic. The alert can be initiated at the user interface and any type of alert can be communicated such as a visual and/or audio indicator. Similarly, the control of the burner assembly can be modified at (760). For instance, the gas flow can be increased, decreased, or suspended.

FIG. 9 depicts a flow chart of a method of controlling a gas cook top appliance according to an exemplary embodiment of the present disclosure. As illustrated in FIG. 9, controller 210 can apply an electrical signal to the grate at the electrical contact surface 135 at (810). An electrical characteristic can be induced in the loop of the grate 130 and the electrical characteristic can be detected at (820). The detected electrical characteristic can be compared to a predetermined electrical characteristic at (825). The predetermined electrical characteristic can be any previously known value before the electrical characteristic is detected at (820). For instance, the predetermined electrical characteristic can be an electrical characteristic previously detected and stored in the controller. Alternatively, the predetermined electrical characteristic can be determined from lookup table, an algorithm, an equation, and/or a model.

When it is determined that the difference or change between the predetermined electrical characteristic and the detected electrical characteristic is less than a predetermined threshold at (830), the controller 210 can maintain the burner assembly control at (840). The threshold can be a single value or range of values. When it is determined that the difference or change between the predetermined electrical characteristic and the detected electrical characteristic is greater than the predetermined threshold at (830), a determination whether to initiate an alert can be performed at (850). If so, an alert can be initiated at (860). The controller 210 can modify the burner assembly control as shown at (870). For instance, the gas flow can be increased, decreased, or suspended.

Figure 10:
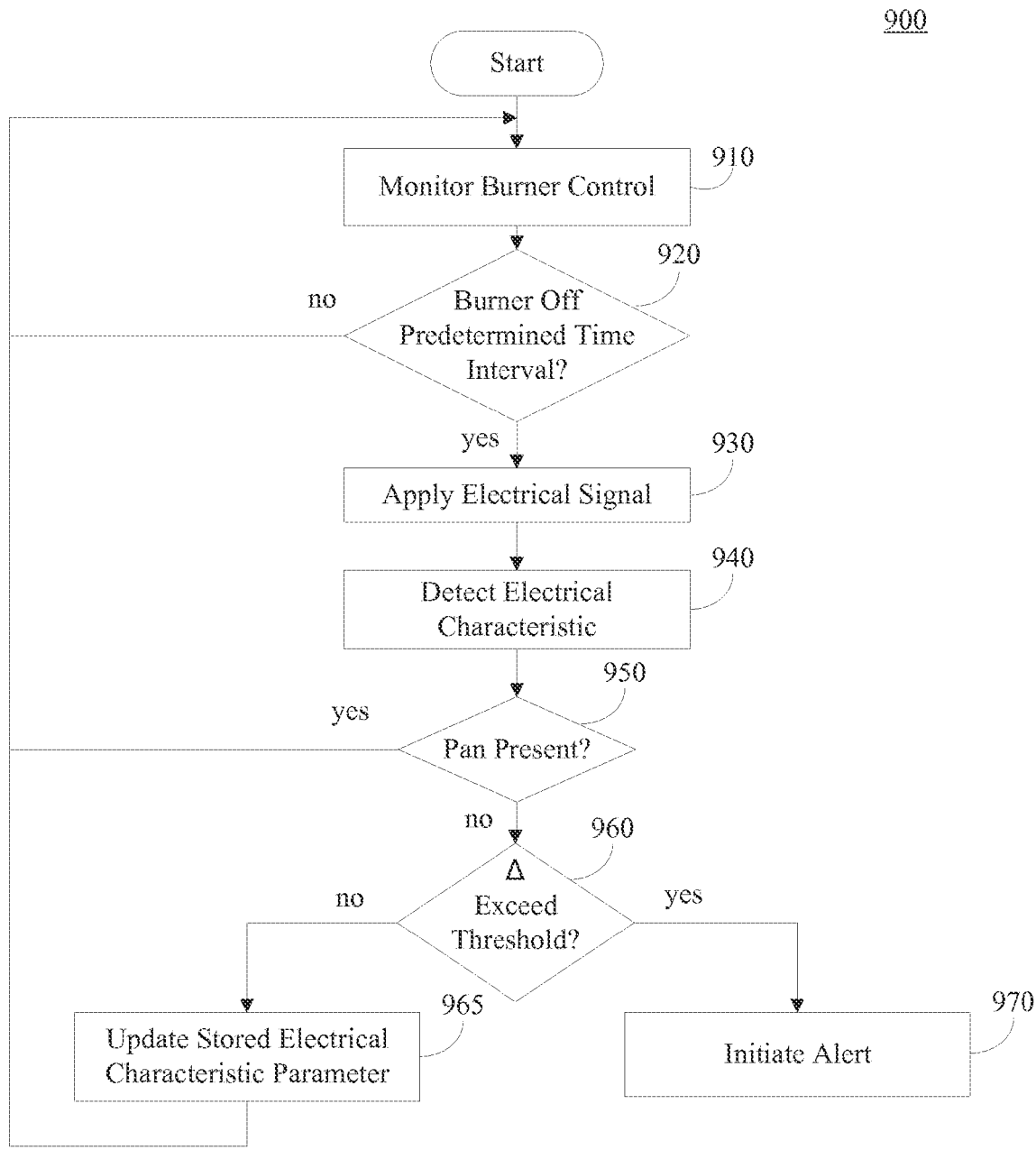
FIG. 10 depicts a flow chart of a method of controlling a cook top appliance according to an exemplary embodiment of the present disclosure.

FIG. 10 illustrates a flow chart of an exemplary method 900 according to an exemplary embodiment of the present disclosure. The method 900 will be discussed with reference to the exemplary gas cook top system illustrated in FIGS. 1-7. However, the method 900 can be implemented with any suitable cook top system such as a gas or an electric resistance cook top system. In addition, although FIG. 10 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined and/or adapted in various ways.

Over a period of time, the detected electrical characteristic can change based on normal wear and use of the gas cook top system 100. For example, grate 130 can include rubber stopper to prevent scratching the surface of the upper cooking surface 104 of gas cook top system 100. As the cook top is used, the rubber stopper can become deformed or even detached and this can affect the electrical characteristic. Method 900 can be used to tune the gas cook top system 100 based on a new detected electrical characteristic.

Burner assembly can be monitored at (910) and when it is determined that the burner assembly has been off for a predetermined time interval, such as four hours, at (920), an electrical signal can be applied to grate 130 at (930). The electrical characteristic can be detected at (940) and the electrical characteristic can be used to determine a cooking utensil characteristic such as the presence of a pan at (950). When no pan is present on the grate 130, the electrical characteristic detected at (940) can be compared to a predetermined electrical characteristic to determine whether the difference between the detected electrical characteristic and the predetermined electrical characteristic exceed a predetermined threshold at (960). For instance, the predetermined threshold can be within 20% of the predetermined electrical characteristic. When the detected electrical characteristic exceeds the threshold an alert is initiated at (970) and when the detected electrical characteristic does not exceed the threshold the detected electrical characteristic is stored as a parameter at (965). The parameter of the electrical characteristic can be used as the predetermined electrical characteristic as described in FIG. 9 or it can otherwise be used in the determination of the cooking utensil characteristic.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of controlling a cooking appliance comprising:
    applying an electrical signal to a cooking utensil support structure of the cooking appliance, where the electrical signal is applied across a gap formed in the utensil support structure, wherein the electrical signal is either an alternating current signal or a radio frequency signal;
    detecting an electrical characteristic induced on the cooking utensil support structure by the electrical signal; and
    determining a cooing utensil characteristic based on the detected electrical characteristic.

2. The method as in claim 1, further comprising controlling the cooking appliance based on the determined cooking utensil characteristic.

3. The method as in claim 1, further comprising controlling the cooking appliance based on the detected electrical characteristic.

4. The method as in claim 1, wherein the electrical characteristic comprises an electrical impedance of the cooking utensil support structure as measured by the application of an alternating current (AC) signal across the gap.

5. The method as in claim 1, wherein determining a cooking utensil characteristic is based on a change in the electrical characteristic.

* * * * *

UNITED STATES PATENT AND TRADEMARK OFFICE
CERTIFICATE OF CORRECTION

PATENT NO. : 9,078,449 B2  
APPLICATION NO. : 13/556602  
DATED : July 14, 2015  
INVENTOR(S) : James Carter Bach and Paul Bryan Cadima Page 1 of 1

It is certified that error appears in the above-identified patent and that said Letters Patent is hereby corrected as shown below:

In The Claims

Column 10 Line 33 "...determining a cooing utensil characteristic..." should read --...determining a cooking utensil characteristic...--

Signed and Sealed this  
Sixteenth Day of August, 2016

Michelle K. Lee  
*Director of the United States Patent and Trademark Office*